(12) United States Patent
Karlsson et al.

(10) Patent No.: US 8,116,204 B2
(45) Date of Patent: Feb. 14, 2012

(54) SCHEDULER

(75) Inventors: Patrik Karlsson, Älta (SE); Joe Constantine, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 331 days.

(21) Appl. No.: 12/300,071

(22) PCT Filed: May 17, 2006

(86) PCT No.: PCT/SE2006/050132
§ 371 (c)(1), (2), (4) Date: Nov. 7, 2008

(87) PCT Pub. No.: WO2007/133136
PCT Pub. Date: Nov. 22, 2007

(65) Prior Publication Data
US 2009/0135721 A1    May 28, 2009

(51) Int. Cl.
*H04J 1/16* (2006.01)

(52) U.S. Cl. .................................. 370/235; 370/230

(58) Field of Classification Search .............. 370/230, 370/235, 232, 234; 455/450, 451, 452.1, 455/452.2, 463, 464
See application file for complete search history.

(56) References Cited

U.S. PATENT DOCUMENTS

2002/0023168 A1* 2/2002 Bass et al. ............... 709/232
2003/0125034 A1* 7/2003 Weerakoon et al. ...... 455/450

FOREIGN PATENT DOCUMENTS

EP    1672941       6/2006
WO    WO 2007017837 A2    2/2007

* cited by examiner

*Primary Examiner* — Huy Vu
*Assistant Examiner* — Dady Chery
(74) *Attorney, Agent, or Firm* — Roger S. Burleigh

(57) ABSTRACT

The present invention relates to a node and a method in a cellular radio network telecommunication system for assigning resources to users, comprising a network node having resources to be allocated to users being present in a radio cell served by the network node. The invention comprises:—assigning a priority to each user in the radio cell, where a user consuming a larger portion of the resources is assigned a lower priority than a user consuming a lower portion of the resources,—receiving a rate request, requesting a larger transmission rate, from a first user having a first priority. If not sufficient free resources are available to fulfill said first users rate request, the following steps are performed:—selecting a second user having lower priority than said first user,—sending messages to said first and second users indication the scheduled grant, and—transferring resources, assigned to said second user, from said second user to said first user, to thereby decrease the consumed resources for said second user and increase the consumed resources for said first user.

18 Claims, 7 Drawing Sheets

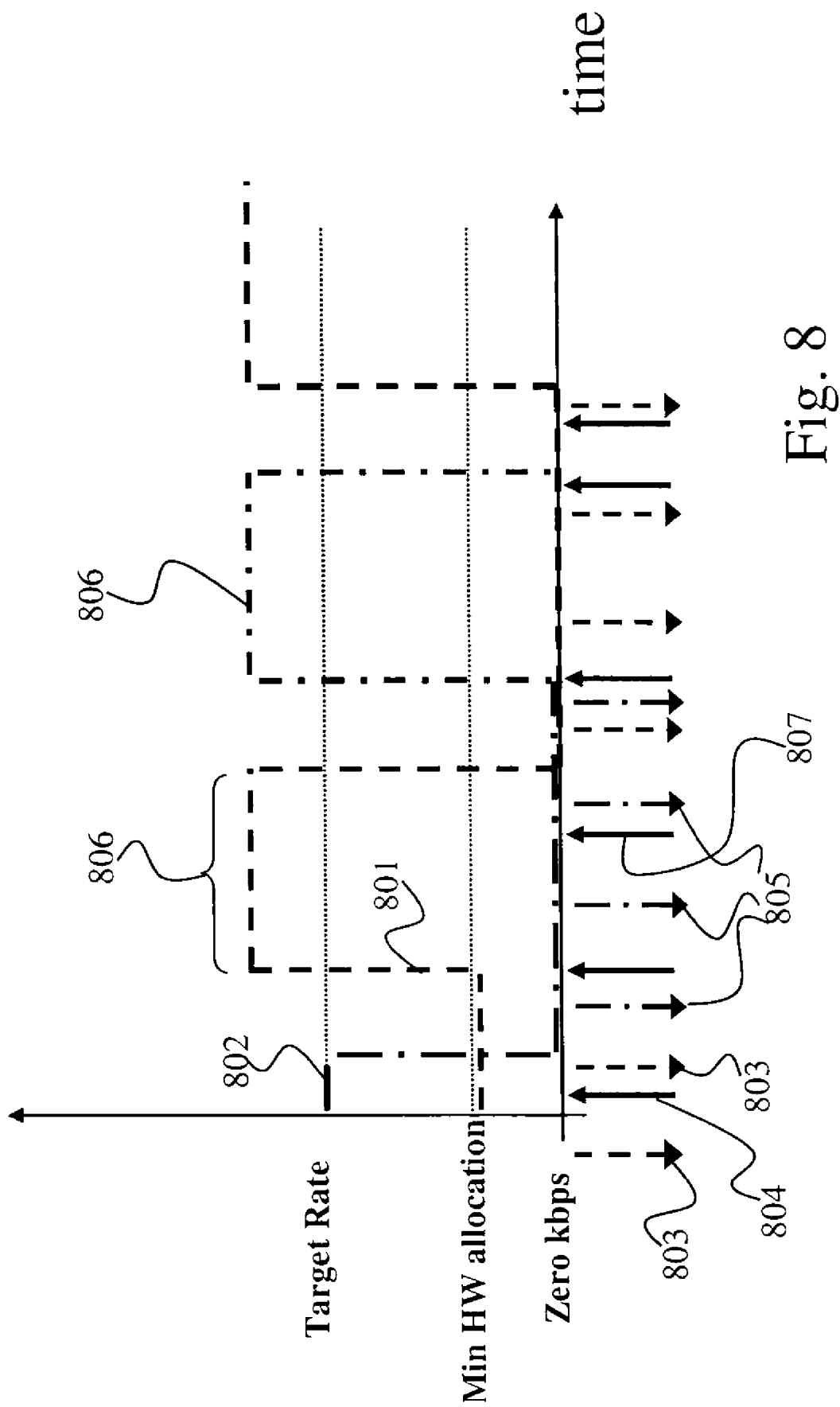

SCHEDULER

TECHNICAL FIELD

The present invention relates to the field of radio telecommunications, and in particular resource allocation in a network node and a method therefore.

BACKGROUND

The present invention finds application particularly in third-generation networks of Wideband Code division Multiple Access (WCDMA) type. However, the techniques may be applicable also in connection with other types of radio networks, such as GSM, CDMA etc.

In radio telecommunications networks a base station or a node B as it is named in WCDMA provides a radio, or air interface to a mobile user terminal, or user equipment. This radio interface is called the Uu interface in WCDMA. The node B is connected to a Radio Network Controller (RNC) which is the network element responsible for control of radio resources in the Universal Mobile Telephony Network (UMTS) Radio Access Network (UTRAN). The Node B and the RNC are connected through the Iub interface. The RNC is in turn connected to a Core Network (CN) which may comprise a number of different network nodes, such as MSC/VLR, SGSN etc.

In third-generation radio access networks increased transmission rates has been a primary goal and new protocols and techniques for achieving increased transmission rates has been developed. A High Speed Downlink Packet Access (HSDPA) protocol has been standardised in WCDMA release 5, and recently it has been complemented by a High Speed Uplink Packet Access (HSUPA) protocol in WCDMA release 6.

In HSUPA different user equipment is assigned different transmission rates, or Grants, ranging from 0 kbps up to 5.76 Mbps. That is, one user may have a larger Grant than another. To support the transmissions, hardware in Node B is allocated in hardware pools and hardware resources are allocated to a particular user to support the transmission rate required. The larger the transmission rates, the more hardware resources required.

Obviously a user with a higher scheduled grant, that is a higher assigned transmission rate, will also consume larger resources from the limited air interface between the UE (user equipment) and the radio base station (RBS), the Uu interface, and also from the interface between the RBS and the RNC, the Iub interface.

These three resources, hardware, air interference in the cell and available link capacity between the RBS and the RNC, are all possible bottlenecks in capacity terms, and it is therefore important to assign the resources to the potential users in an effective manner.

SUMMARY

It is an object according to one aspect of the present invention to provide such apparatus and method that effectively distribute the available resources in a network node to users.

One object according to an aspect of the invention is to provide such apparatus and method that provides fast initial uplink transmission in a WCDMA compliant network node.

One object according to an aspect of the invention is to provide such apparatus and method that distribute limited resources between users in a WCDMA network.

One object according to an aspect of the invention is to provide such apparatus and method that assigns a target transmission rate to users in a WCDMA network.

These objects among others are, according to a one aspect of the present invention, attained by a method in a cellular radio network telecommunication system for assigning resources to users, comprising a network node having resources to be allocated to users being present in a radio cell served by the network node.

The method comprises the steps:—assigning a priority to each user in the radio cell, where a user consuming a larger portion of the resources is assigned a lower priority than a user consuming a lower portion of the resources,—receiving a rate request, requesting a larger transmission rate, from a first user having a first priority.

If not sufficient free resources are available to fulfil said first users rate request, the following steps are performed:—selecting a second user having lower priority than said first user,—sending messages to said first and second users indication the scheduled grant, and—transferring resources, assigned to said second user, from said second user to said first user, to thereby decrease the consumed resources for said second user and increase the consumed resources for said first user.

These objects among others are, according to another aspect of the present invention, attained by a radio base station in a radio telecommunication system comprising resources to be allocated to users being present in a radio cell served by the radio base station.

The radio base station comprises means for assigning a priority to each user in the radio cell, where a user consuming a larger portion of the resources is assigned a lower priority than a user consuming a lower portion of the resources, means for receiving a rate request, requesting a larger transmission rate, from a first user having a first priority, means for selecting a second user having lower priority than the first user and means for transferring resources from the second user to the first user, to thereby decrease the consumed resources for the second user and increase the consumed resources for the first user if not sufficient free resources are available to fulfil said first users rate request.

If free resources are available, new users or users requesting increased rate are primarily allocated available free resources. Eventually, however, in a high traffic scenario, all resources will already be allocated to users present in the cell. To be able to serve new users, or users requesting increased transmission rate, the node B need to reduce the rate for at least one other user.

By assigning a priority to each user consuming a resource for which a capacity limitation has occurred and selecting a second user, also know as rescheduling candidate, having lower priority than the requesting user a fair distribution can be achieved. The priority is selected so that a user consuming a larger quantity of a resource is assigned a higher priority. Thus, for rescheduling to occur, that is for the node B to redistribute resources from one user to another, the rescheduling candidate will always use more resources than a requesting user prior to the rescheduling.

According to one variant of the invention a target transmission rate is assigning to the cell, and a second user having lower priority than the first user and a scheduled rate which is larger than the target rate is selected.

By assigning a target rate, that is a specific transmission rate which is the lowest rate any user in the cell should be allowed to have, to the cell and requiring that the rescheduling candidate should have a larger rate than the target rate, in the long term, in a capacity limited scenario, all users will asymptotically approach the target rate. By selecting the target rate appropriately the operator of the network node can optimise between having many users in the cell each having lower transmission rates, or fewer users in the cell each having higher transmission rates.

According to one variant of the invention a second user for which, after the step of transferring, the rate is still equal to or larger than the rate for the first user is selected.

According to one variant of the invention a higher priority is assigned to a user having requested a higher rate for a longer time.

If two users have consumed the same amount of resources, the user having requested higher transmission rate for the longer time is assigned a higher priority.

According to one variant of the invention a lower priority is assigned to a user which has consumed a particular amount of the resources for a longer time than a user which has consumed the same amount of the resources for a shorter time.

If two users have consumed the same amount of resources, the user having consumed the resources for the longer time is assigned a lower priority. If a user has consumed the same amount as another user for longer time, but also has been requesting for even higher capacity for longer time, the user is assigned a higher priority.

According to one variant of the invention, if the first user has a scheduled rate which is lower than the target rate, and there are no second user which after the step of transferring would have a rate above the target rate, or if a maximum number of simultaneously active users has been reached, a second user having consumed the resources at least for a defined time and having a rate equal to or above the target rate is selected and all, or alternatively a portion, of the second users resources are transferred to the first user. This process is called time scheduling.

In this scenario there are no available free resources to give to a new user, or a user having not reached the target rate. Further more there are no rescheduling candidates either, or the maximum numbers of simultaneous user has been reached. Since no rescheduling candidates can be found, all current users are transmitting at the target rate or so close to the target rate that the amount above is not possible to reschedule with any efficiency. Obviously there would be a minimum rate increase for which rescheduling is economically defendable.

To be able to serve more users, a time scheduling is applied according to the above. In time scheduling one user having a scheduled rate equal to or above the target rate, and having used this rate for a definable time is selected as the time scheduling candidate. All of the resources, or alternatively a large portion of the resources, allocated to the time scheduling candidate are then transferred to the requesting user, and thus the time scheduling candidate will have zero rate, or alternatively some smaller rate, after rescheduling. This time scheduled user will, provided the user has data to transmit, eventually return with a rate request and will then be allocated a new time slice from another user according to the scheme outlined above.

In one variant of the time scheduling according to the invention, where hardware is allocated for a scheduled rate, but where the hardware is not the capacity limiting resource, the hardware allocated to the time scheduling candidate is not de-allocated at time scheduling.

By this arrangement, when the rescheduling candidate is once again allocated the capacity limiting resources no new hardware need to be allocated. This is beneficial since hardware allocation may be time consuming.

According to one variant of the invention the actual transmission rate for users located in the cell is measured and a second user not utilising the scheduled rate is primarily selected and a user having lower priority is only selected for rescheduling, if no user not utilising its scheduled rate is found.

Thereby, a better utilisation of the available resources can be achieved.

According to one variant of the invention a first amount of hardware resources is allocated during call set-up to all users entering the cell.

By pre-allocating hardware, before any request for scheduled data transmission is received from the user equipment, the delay before start of transmission, when such a requests arrive at the base station, can be minimised.

According to one variant of the invention the resources are any of: Hardware resources, uplink air interface, uplink Iub link.

Hardware resources are typically decoding resources, demodulating resources etc. The hardware resources are often arranged in resource pools. Uplink air interface resources are related to interference load in the air interface between the radio base station and the terminal. Only a limited amount of radio traffic can be carried over the air interface at the same time. The uplink Iub link, is the capacity of the link between the radio base station and the radio network controller. Other capacity limiting resources may also be present in different network configurations.

According to one variant of the invention the network node is compliant to the standard WCDMA Release 6 and the users are High Speed Uplink Packet Access, hereinafter referred to as HSUPA, users and the step of receiving a rate request is receiving a rate request for uplink transmission according to HSUPA.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 8, which are given by way of illustration only, and thus are not limitative of the present invention.

FIG. 8 is a schematic plot of allocated transmission rate for a time scheduled user.

DETAILED DESCRIPTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
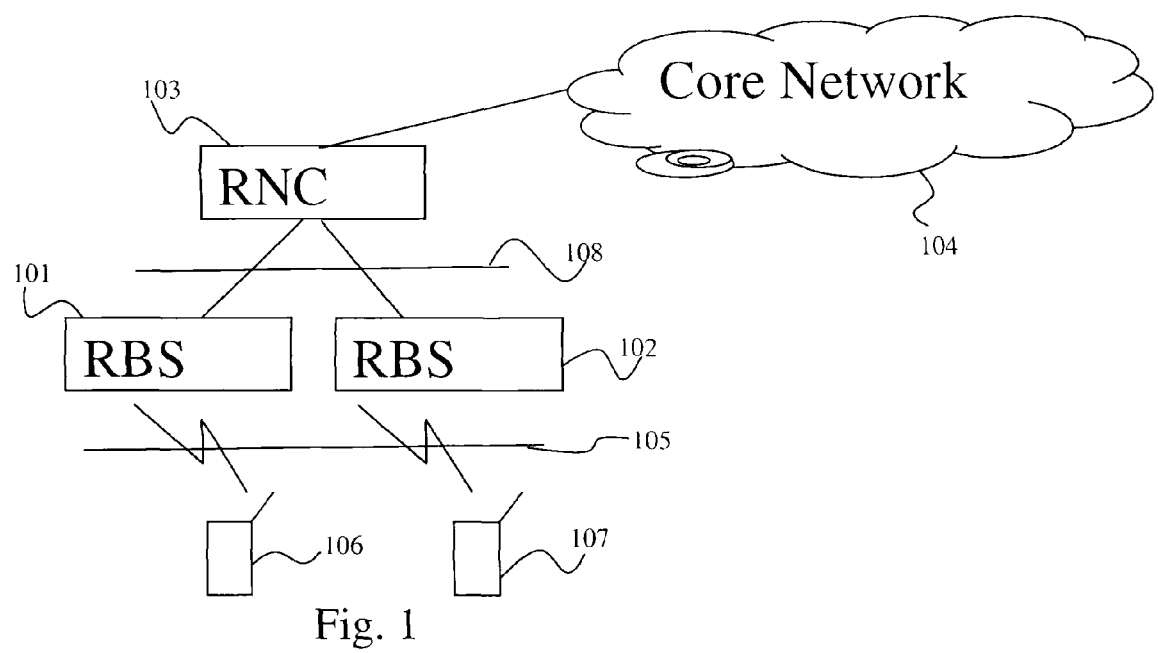
FIG. 1 is a schematic block diagram of a network arrangement according to one variant of the invention.

FIG. 1 is a schematic block diagram showing two radio base stations (RBS) 101 and 102 connected to a radio network controller (RNC) 103. The RNC is further connected to a core network 104, which may comprise a number of different network nodes. The RNC 103 and the two RBSs 101 and 102 together forms a radio access network (RAN). A general RAN may of course comprise several more RBS and RNC nodes.

The RBSs supports an air interface 105 between the RBS and user equipment 106 and 107. Again, only two user equipments are shown for simplicity. The air interface 105 is denoted the Uu interface in wideband code division multiple access (WCDMA) applications. The interface 108 between the RBS and the RNC is denoted the Iub interface in WCDMA applications.

Figure 2:
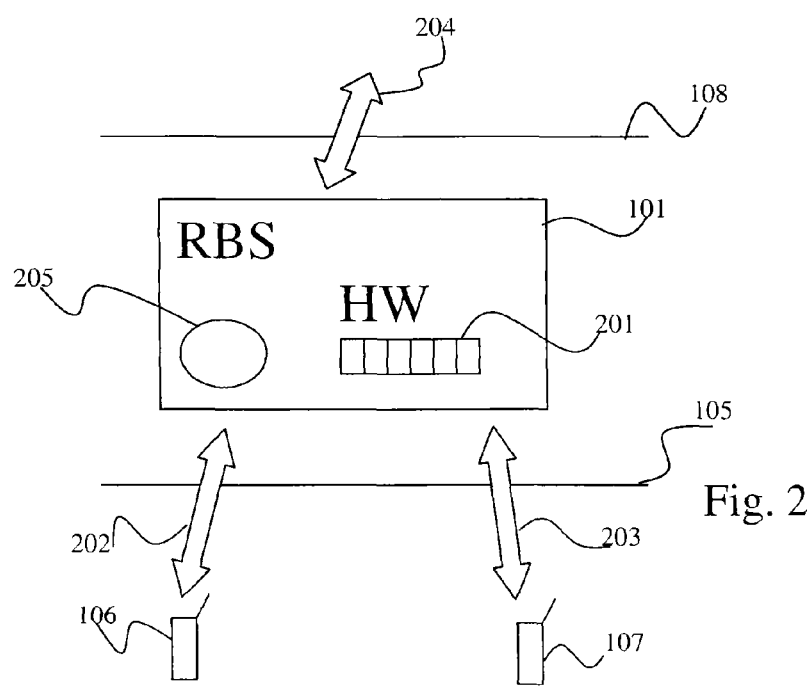
FIG. 2 is a schematic diagram of network node in greater detail according to one variant of the invention.

FIG. 2 is a schematic block diagram showing the RBS 101 in FIG. 1 in greater detail. In FIG. 2 the first user 106 and the second user 107 are sending data to the RBS 101 through a packet switched connection 202 and 203 according to the high speed uplink packet access (HSUPA) protocol defined in WCDMA release 6 over the air interface 105. The first user 106 has a scheduled grant of 128 kbps and the second user has a scheduled grant of 64 kbps. To support this transmission rate, and to be able to receive the data from the user equipments in the RBS 101, the RBS 101 allocates hardware resources to each user from a hardware pool 201. The data received from the users 106 and 107 in the RBS are forwarded 204 through the Iub link interface 108 to the RNC. A scheduler process is schematically shown in FIG. 2 and denoted 205. It will be further described below.

The air interface Uu 105 is loaded with the transmissions from the users 106 and 107. The air interface Uu may only carry a certain amount of traffic determined by the specific interference conditions prevailing. Likewise, the hardware in the RBS 101 is also limited and may only support a specific amount of user traffic, as is also valid for the Iub link 108.

The amount of hardware in an RBS is of course an implementation decision, as is the Iub link capacity and these may thus vary between different installations. The capacity of the air interface Uu is not dependent on design considerations, other than possibly locations of antennas etc, but is limited by the amount of interference, as is known by the man skilled in the art.

Thus it is clear that the distribution of the available capacity between different users is of outmost importance with respect to economy, fairness, quality of service etc.

Figure 3:
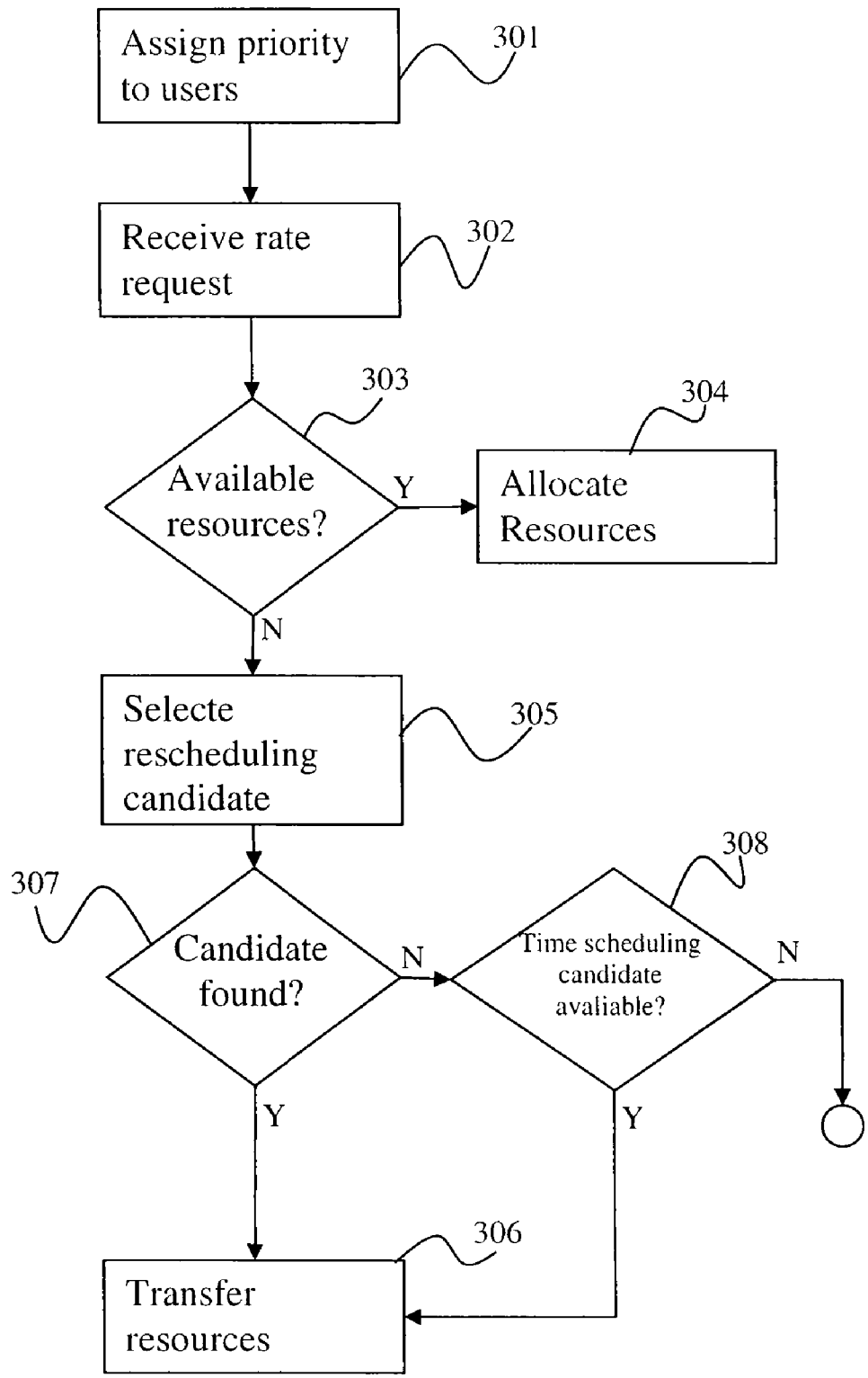
FIG. 3 is a schematic flow diagram of a method according to one variant of the invention.

FIG. 3 is a schematic flow diagram disclosing the general workings of a scheduler in an RBS according to one aspect of the invention. In a first step 301 users, or user equipments, the terms are used as synonyms in the present document, are assigned priorities based on the current usage of the resource in question.

In a step 302 the scheduler receives a rate request from a user located in a cell served by the RBS requesting an increased grant. The scheduler checks, in a step 303, if there are available resources and if so allocates resources in step 304 to the user and sends a grant message to inform the user of the new increased scheduled rate. If there are no free resources available to fulfill the users request appropriately, the scheduler needs to reschedule resources from one user to the requesting user is a suitable candidate can be found.

In step 305 one or more rescheduling candidates is identified and one is selected, as will be discussed in greater detail below. In step 307 it is verified if a rescheduling candidate could be found and, if so, in step 306 at least some of the resources allocated to the rescheduling candidate are transferred to the requesting user. If no rescheduling candidate could be found, it is checked in step 308 if a time scheduling candidate can be found, and if so its resources are transferred in step 306. If no time scheduling candidate could be found no action is taken and the request is scraped.

Figure 4:
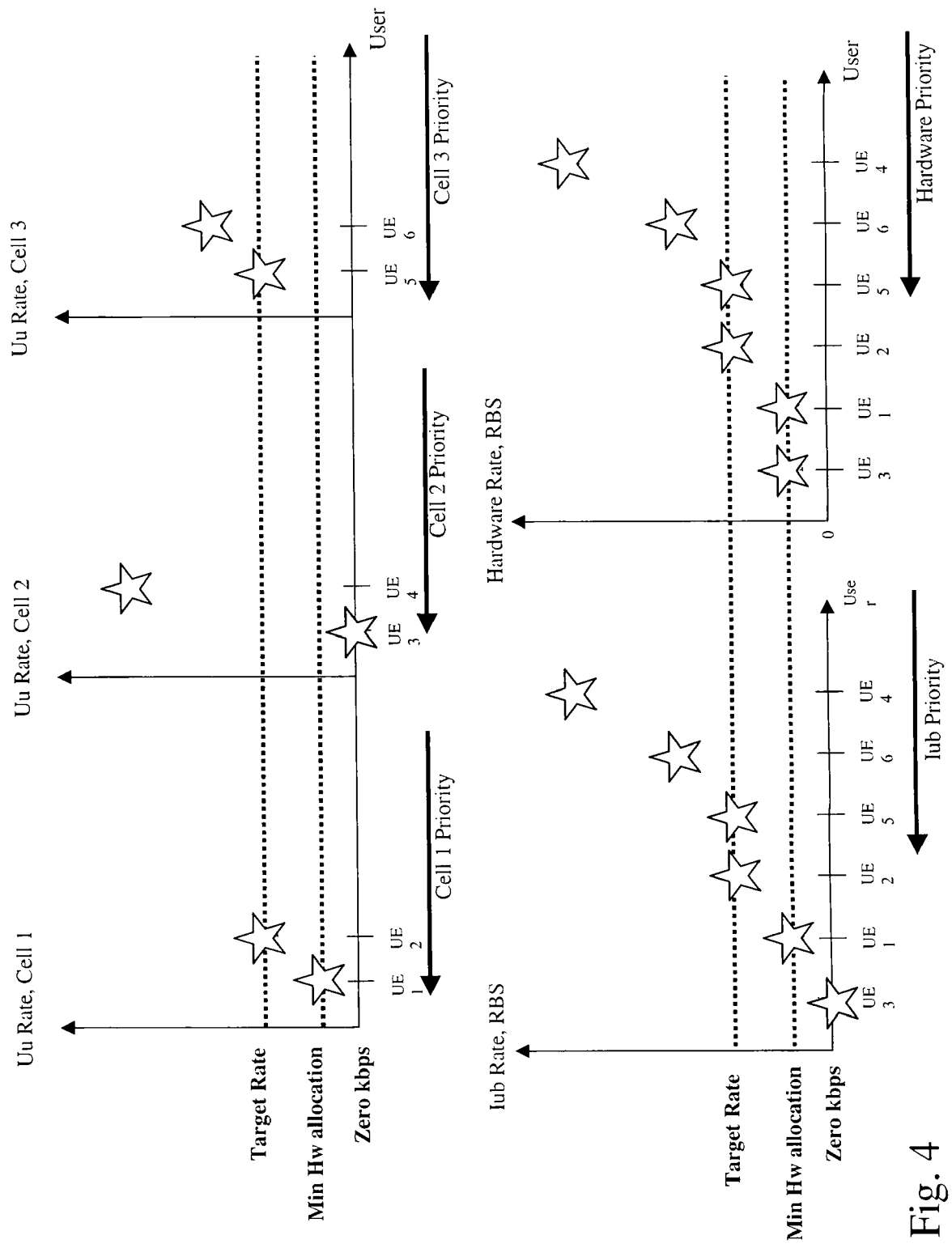
FIG. 4 is a series of schematic drawings illustrating priority assignment of users according to one variant of the invention.

FIG. 4 is a schematic diagram showing the priority of six different user equipments UE1 to UE6. The user equipments are located in three different cells served by one RBS and the top most part of FIG. 4 disclose the respective priority of the user equipments with respect to the air interface in the respective cell. In cell 1 UE1 has a scheduled rate equal to the minimum hardware allocation rate and UE2 has a scheduled rate equal to the target rate. Consequently, UE1 has a higher priority than UE2. In FIG. 4 priority increases towards the left on the X-axis. In cell 2 UE3 has zero scheduled rate and UE has a scheduled rate well above the target rate, and for cell 3 UE5 has a scheduled rate equal to the target rate and UE6 has a scheduled rate somewhat above the target rate.

In the lower leftmost diagram in FIG. 4 a corresponding plot is shown for the Iub interface. As can be seen UE3, which had zero allocated rate in the cell also has zero Iub rate and consequently the highest priority. UE4 has the lowest priority since UE4 utilizes the most of the resources in the Iub interface.

In the lower rightmost diagram in FIG. 4 a corresponding plot is shown for the hardware priority. As can be seen from the diagram UE3 and UE1 has the same priority since, in this embodiment, a specific amount of hardware is pre-allocated, even though no transmissions are ongoing. Therefore, hardware is allocated for UE3 even though UE3 is not using any resources at cell or Iub level.

Figure 5:
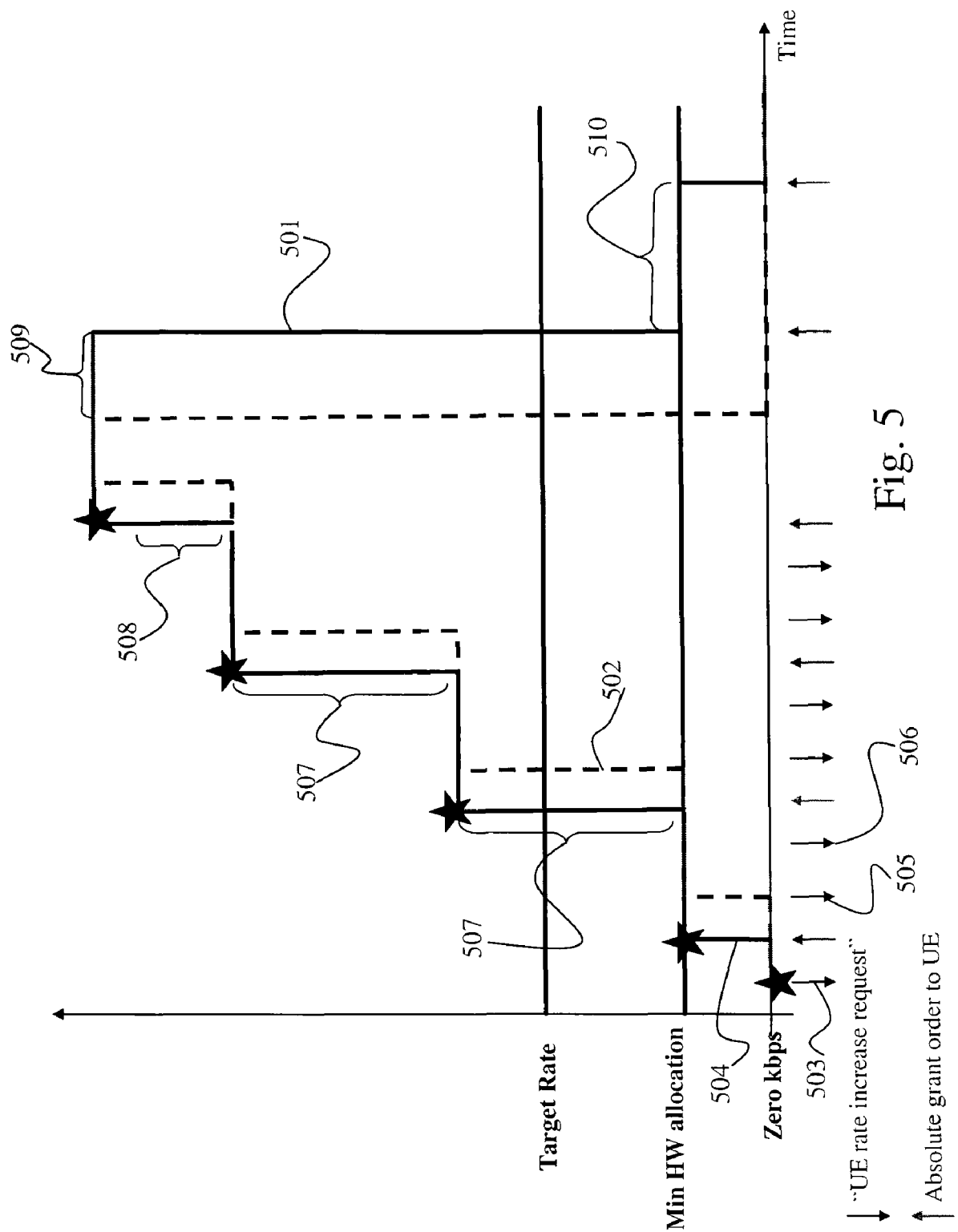
FIG. 5 is a schematic diagram illustrating allocation of resources to a user according to one aspect of the invention.

FIG. 5 is a schematic diagram disclosing the process of increasing the grant and thus the transmission rate of a user.

It should be noted that the terms grant, scheduled grant, rate and scheduled rate are used interchangeably through this description and is used to denote the transmission rate allocated to a user equipment from the radio base station. The terms transmission rate and rate are used to denote the actual transmission rate used by a user equipment. These are however often the same. Whenever the term rate is used the context should be sufficient to decide in which meaning the term is used, if it would be necessary to differ the meaning.

In FIG. 5 a line 501 illustrates the scheduled grant changes and a dashed line 502 denotes the transmission rate used by the user equipment. A user sends a rate increase request 503 and is allocated a scheduled rate equal to the minimum hardware allocation rate. At this first allocation the user is only allocate a rate equal to the hardware already pre-allocated to the user. No extra hardware is thus allocated when the first rate increase is received, since a minimum hardware was already allocated at the call set-up procedure. This allows for a quick start of transmission from the user equipment.

After a small time the user equipment start utilizing the scheduled grant as is seen by the dashed line. Any further rate requests received from the user during this time is ignored. The RBS can monitor the received transmission rate to verify when the user equipment has adapted to the new increased rate, or a timer can be used which is set to a suitable time when the user equipment normally would have adapted. The reason for ignoring further rate requests is that it should be certain that the user equipment base its decision to request further increase of transmission rate on the correct allocated grant. Rate requests received too soon may be sent from the user equipment based in the old scheduled grant, if a new further increased grant is sent instability may occur or the user may use an unfair amount of the available resources, and thus "steal" resources from other legitimate users.

The user sends a further rate request 505 which is ignored and yet a further rate request 506. At this time the RBS allocates a maximum step rate increase 507, set in the RBS and sends the new scheduled grant to the user equipment. The maximum step rate increase is set in the RBS to a suitable value based on the particular circumstances. It is provided to give a substantial rate increase without allocating all resources to only one user. Additionally, a too large step could increase the interference in the cell too quickly, and may even cause dropped calls. In this particular example the user is still not satisfied so another maximum step rate increase is allocated to the user.

At this point one of the resources in the RBS, that is the Uu interface resource, the Iub link resource or the hardware resource is getting low. When the user sends a further rate increase only a minimum step rate increase 508 is allocated.

After a while the user is finished with the transmissions as is indicated by the dashed line 502. After a defined time 509 of inactivity resources are freed down to the minimum hardware allocation rate and after yet a further time 510 a zero grant is applied. It should be noted however that, even though the resources for the Iub interface and the Uu air interface are set to zero, the hardware are only released down to the minimum hardware allocation to be able to quickly start any new transmissions if needed.

Figure 6:
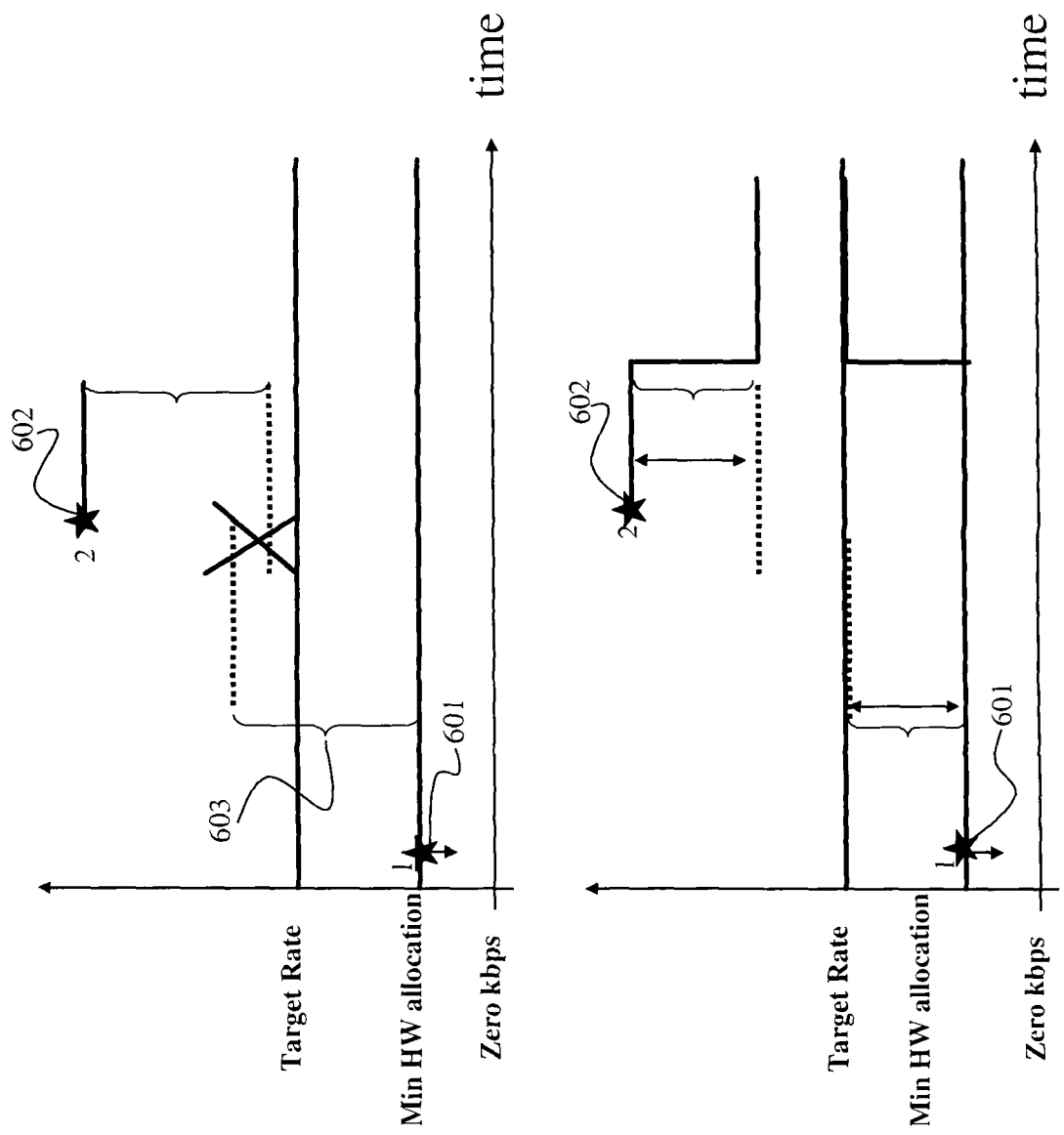
FIG. 6 is a schematic diagram illustrating rescheduling of resources to users according to one aspect of the invention.

FIG. 6 is a schematic diagram disclosing the basic principle of rescheduling, that is, the process of re-distributing resources between users. Rescheduling will take place if there is a user requesting increased rate, if a rescheduling candidate exists which has a lower priority than the requesting user in the limiting resource pool, if the scheduled rate for the requesting user can be set to at least the target rate and if the scheduled grant for the rescheduling candidate, after rescheduling is at least a large as the scheduled grant for the requesting user after rescheduling.

In the top most diagram in FIG. 6 a first user 601 sends a rate request for increased rate. A rescheduling candidate 602 is identified having the lowest priority in the limiting resource pool. However, if the first user 601 would be allocated the maximum step increase rate 603, and the rescheduling candidate would thus have a corresponding decrease, the rate for the rescheduling candidate 602 would be lower than the rate for the first user 601. This is against the rescheduling rules above and so the rescheduling according to these terms can not be achieved.

In the lower diagram in FIG. 6 a successful rescheduling is illustrated. Here the requesting user 601 is allocated the target rate and the rate for the rescheduling candidate is larger than the rate for the requesting user 601. Thus, rescheduling takes place and the resources are transferred from the rescheduling candidate 602 to the requesting user 601.

Figure 7:
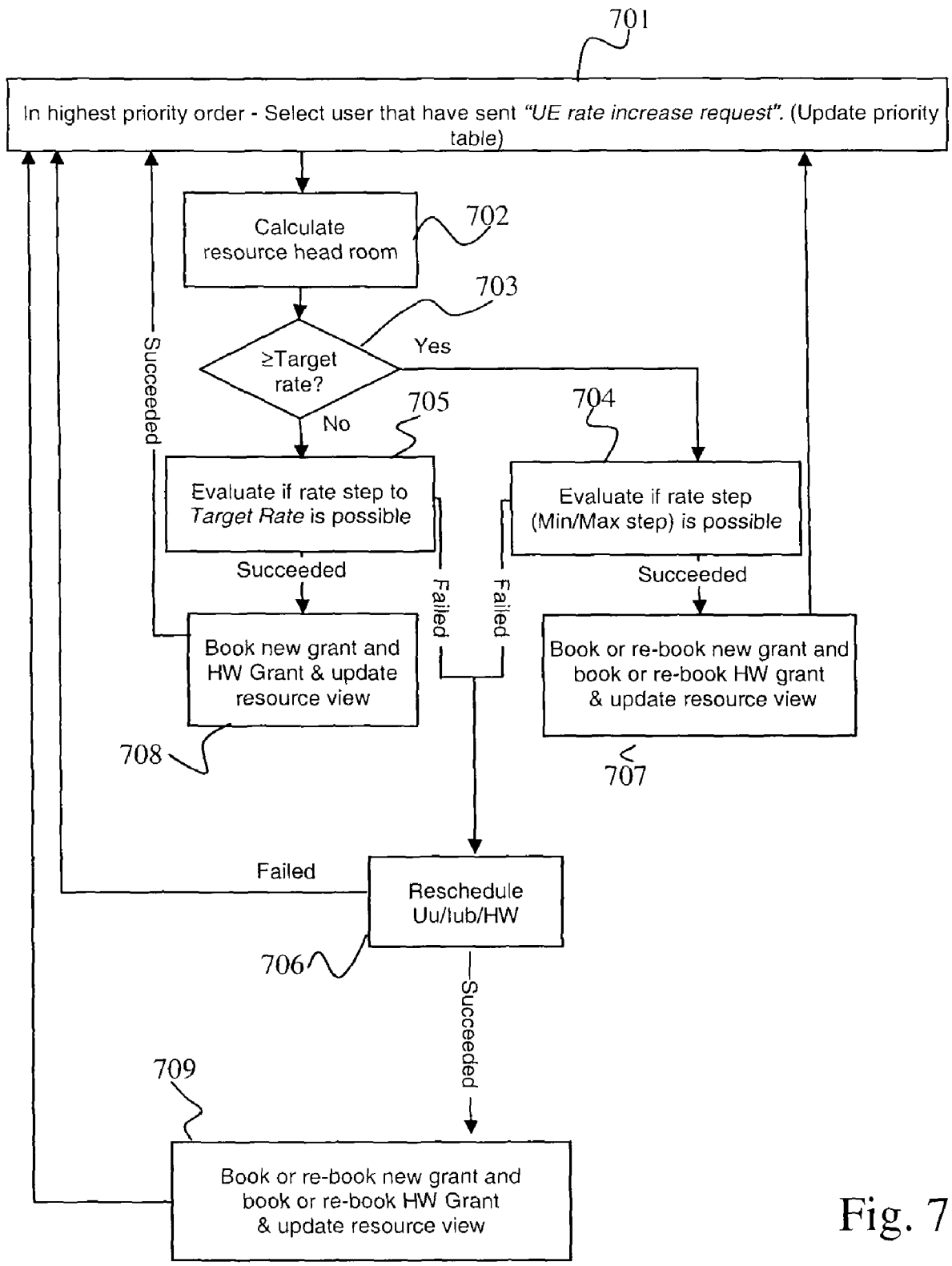
FIG. 7 is a schematic flow diagram according to one aspect of the invention.

FIG. 7 is a schematic flow diagram according to one aspect of the invention. In step 701 a $user_i$, having sent a "UE rate increase request" and having the highest priority is selected for scheduling. Thus, in this embodiment all rate requests are received in another process (not shown) and queued. In step 702 a resource headroom is calculated.

If the hardware rate for $user_i$ is equal to the scheduled grant the resource headroom is equal to:

Resource headroom=min{available Uu resources, available Iub resources, available hardware}

If the hardware rate for the $user_i$ is larger than the scheduled rate the resource headroom is equal to:

Resource headroom=min{available Uu resources, available Iub resources, hardware rate for $user_i$–scheduled grant for $user_i$}

The hardware rate is the transmission rate supported by the currently allocated hardware for the $user_i$. Since hardware is often time consuming to allocate it can be beneficial to allocate more hardware than what is scheduled for the remaining resources to save time in later scheduling. Sometimes it is also not possible to allocate hardware in so small quantities as it is possible to allocate Uu and Iub resources.

The (hardware rate for $user_i$–scheduled grant for $user_i$) is a measure of how much hardware resources the present user has allocated in hardware, but not scheduled in the other resource pools. If this figure equals zero new hardware resources need to be allocated to the user.

In step 703 a check is made to see if the scheduled rate or the booked rate for $user_i$ is larger than or equal to the target rate. Booked rate is a scheduled rate which has not yet been sent out to the user. If the rate is larger than the target rate the process continues in step 704 else the process continues in step 705.

An evaluation regarding if either a minimum or maximum rate step increase is possible for the $user_i$ is performed in step 704.

If the user has a booked grant equal to the target rate, and since the maximum step rate increase normally should be greater than the target rate, it is possible that the user could get an additional raise up to the maximum step rate increase if there is enough headroom. Thus, in a step 707, the user is given a rate increase of:

Rate increase=min{headroom, max step–(Target rate–scheduled rate)}

If the $user_i$ has no booked grant, that is the scheduled grant is equal to or larger than the target rate, then if the headroom is less than the minimum step rate increase it is not possible to give any further rate increase and the present user is removed and the possibilities for rescheduling is evaluated in step 706. Else, in step 707, the $user_i$ is given a rate increase of:

Rate increase=min{headroom, max step}

In step 707 the rate increase for $user_i$ is booked, that is the rate increased for $user_i$ is updated in the a resource view keeping track of the utilization of the different resources and a grant message is generated and queued for sending to the $user_i$ on a grant channel.

If the user has a scheduled or booked rate which is less than the target rate it is evaluated in step 705 if a rate increase to the target rate is possible. If the target rate is less than the headroom the target rate is booked in step 708 similarly to step 707.

If any of steps 704 or 705 fails the process continues with step 706 in which rescheduling is processed as disclosed previously with reference to FIG. 6. In step 709 the new grants for the requesting user and the rescheduling candidate are booked.

If, in step 706 in FIG. 7, no rescheduling candidate can be found, time scheduling can be applied according to one aspect of the present invention. If the requesting user has a scheduled or booked grant which is less than the target rate and a rescheduling candidate can be found which has a lower priority in the limited resource pool than the requesting user and a scheduled rate which is equal to or larger than the target rate, this rescheduling candidate may be used for rescheduling even though the rescheduling candidate will not have a higher scheduled grant than the requesting user after rescheduling. Thus, time scheduling is the process where two or more users share the available resources over time as is disclosed in greater detail below.

FIG. 8 is a schematic time diagram disclosing time scheduling. A first user has a transmission rate 801, indicated by the dashed line, equal to the min hardware allocation rate and sends an increased rate request 803. The scheduler 205 in FIG. 2 evaluates the situation and is unable to find free resources or a rescheduling candidate and thus seeks for a time scheduling candidate, which transmission rate is indicated by the dash-dot line 802 in FIG. 8.

A grant message is sent to the time scheduling candidate to reduce the scheduled grant down to zero kpbs. After a specific time, or when the RBS detects that the time scheduling candidate has reduced its transmission rate to a configurable rate, such as zero kpbs, an increased grant is sent to the requesting user 801, which increases its transmission rate to the new available rate.

Since the time scheduling candidate has more data to send it will send increased rate requests 805. The time scheduling candidate 802 is now the requesting user. After a definable time 806 the scheduler sends a new grant 807 to the user 801 setting the scheduled grant to a configurable rate, such as zero kbps and the process repeats. Thus, user 801 and user 802 share the available resources over time.

In a more realistic example, even though the above example involving a pair of users selected for time scheduling may be preferable in some implementations, the scheduler would probably find a third user which had already transmitted for the definable time 806, when a new rate request is received from the user 802 after the time scheduling is finished. This third user would then be time scheduled with user 802. In this way a definable number of users may simultaneously share resources over time in a round-robin fashion.

It should also be noted that if excess hardware is available the scheduler may not necessarily release hardware between time scheduling to thereby perform time scheduling in a faster way.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method in a cellular radio network telecommunication system for assigning resources to user devices, wherein said system includes a network node having resources to be allocated in a radio cell served by said network node, said method comprising the steps of:
assigning a priority to each user device in said radio cell, wherein a user device consuming a larger portion of said resources is assigned a lower priority than a user device consuming a lower portion of said resources, and wherein a higher priority is assigned to a user device having requested a higher rate for a longer time;
receiving a rate request for a larger transmission rate from a first user device having a first priority; and,
if not sufficient free resources are available to fulfill said first user device rate request:
selecting a second user device having lower priority than said first user device;
sending messages to said first user device and second user device indicating a scheduled grant; and,
transferring resources assigned to said second user device from said second user device to said first user device to thereby decrease the consumed resources for said second user device and increase the consumed resources for said first user device; and
if said first user device has a scheduled rate which is lower than a target rate and, in said step of selecting, no second user device can be found which has a scheduled rate which is larger than said target rate, or if a maximum number of simultaneously active user devices has been reached, then:
in said step of selecting, selecting a second user device having consumed resources at least for a defined time; and, in said step of transferring, transferring all, or a part, of said second user device resources to said first user device.

2. The method according to claim 1, further comprising the steps of:
assigning a target transmission rate to the cell; and,
in said step of selecting, selecting a second user device having lower priority than said first user device and a scheduled rate which is larger than said target rate.

3. The method according to claim 1, wherein said step of selecting comprises selecting a second user device for which, after said step of transferring, the rate is still equal to or larger than the rate for said first user device.

4. The method according to claim 1, wherein said step of assigning comprises assigning a lower priority to a user device which has consumed a particular amount of said resources for a longer time than a user device which has consumed the same amount of said resources for a shorter time.

5. The method according to claim 1, further comprising the steps of:
measuring the actual transmission rate for user devices located in said cell; and,
in said step of selecting, primarily selecting a second user device not utilizing the scheduled rate and secondarily selecting a user having lower priority.

6. The method according to claim 1, comprising the further step of allocating, during user initiation, a first amount of hardware resources to all user devices entering said cell.

7. The method according to claim 1, wherein said resources are any of: Hardware resources, uplink air interface, and uplink Iub link.

8. The method according to claim 1, wherein said network node is compliant to the standard WCDMA Release 6 and said user devices are High Speed Uplink Packet Access (HSUPA) devices and said step of receiving a rate request comprises receiving a rate request for uplink transmission according to HSUPA.

9. The method according to claim 1, wherein said resources comprise hardware resources and at least one further resource, said method further comprising the steps of:
allocating hardware resources to the user device at call setup to support a first transmission rate and,
if said user device has a scheduled grant of 0 kbps, allocating sufficient resources, if available, from said second resource to support said first transmission rate.

10. A radio base station in a radio telecommunication system having resources to be allocated to user devices present in a radio cell served by said radio base station, comprising:
means for assigning a priority to each user device in said radio cell, wherein a user device consuming a larger portion of said resources is assigned a lower priority than a user device consuming a lower portion of said resources;

means for receiving a rate request for a larger transmission rate from a first user device having a first priority;

means for selecting a second user device having lower priority than said first user device;

means for transferring resources from said second user device to said first user device to thereby decrease the consumed resources for said second user device and increase the consumed resources for said first user device if not sufficient free resources are available to fulfill said first user device's rate request, and, means for determining if said first user device has a scheduled rate which is lower than a target rate and, if no second user device can be found which has a scheduled rate which is larger than said target rate, or if a maximum number of simultaneously active user devices has been reached, then:

selecting a second user device having the lowest priority and having consumed resources at least for a defined time; and, transferring all, or a part, of said second user device resources to said first user device.

11. The radio base station according to claim 10, further comprising:

means for assigning a target transmission rate to the cell; and, means for selecting a second user device having lower priority than said first user device and a scheduled rate which is larger than said target rate.

12. The radio base station according to claim 10, further comprising:

means for selecting a second user device for which, after said step of transferring, the rate is still equal to or larger than the rate for said first user device.

13. The radio base station according to claim 10, further comprising:

means for assigning a lower priority to a user device which has consumed a particular amount of said resources for a longer time than a user device which has consumed the same amount of said resources for a shorter time.

14. The radio base station according to claim 10, further comprising;

means for measuring the actual transmission rate for user devices located in said cell; and, means for primarily selecting a second user device not utilizing the scheduled rate and secondarily selecting a user device having lower priority.

15. The radio base station according to claim 10, further comprising:

means for allocating, during user initiation, a first amount of hardware resources to all user devices entering said cell.

16. The radio base station according to claim 10, wherein said resources are any of: Hardware resources, uplink air interface, and uplink Iub link.

17. The radio base station according to claim 10, wherein said radio base station is compliant to the standard WCDMA Release 6 and said user devices are High Speed Uplink Packet Access (HSUPA) user devices and said step of receiving a rate request comprises receiving a rate request for uplink transmission according to HSUPA.

18. A radio telecommunications system comprising a radio base station according to claim 10.

* * * * *